Oct. 4, 1960                    H. RITTER                 2,955,186
                    ELECTRIC HEATER FOR COOKING OR THE LIKE
Filed Aug. 5, 1957                                    3 Sheets-Sheet 1
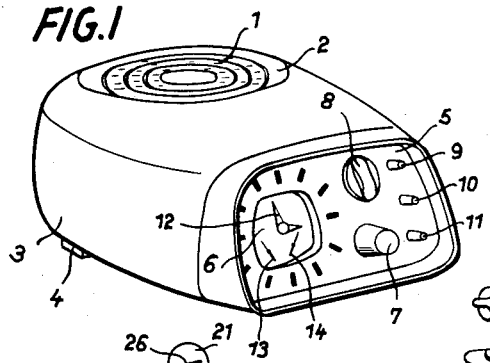
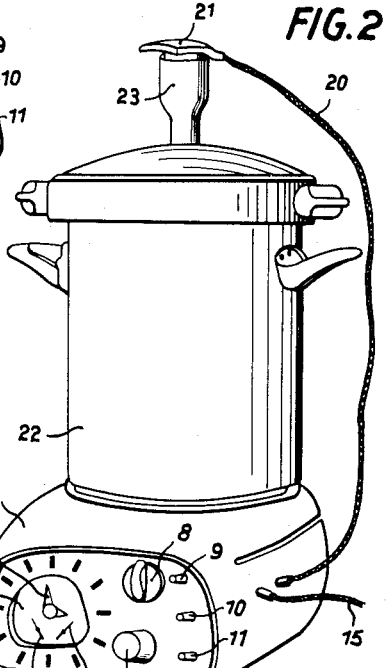
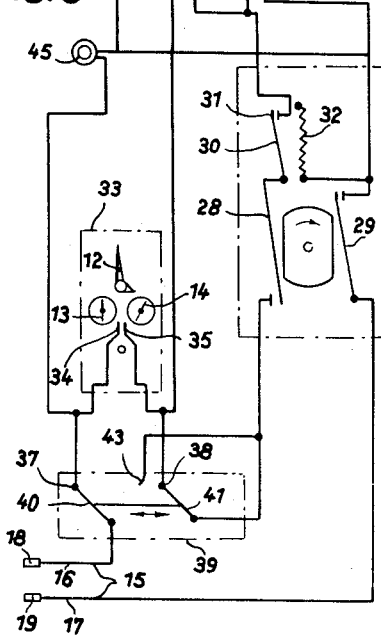
INVENTOR
Heinrich Ritter
BY Michael S. Striker
ATTORNEY Oct. 4, 1960                         H. RITTER                         2,955,186
                    ELECTRIC HEATER FOR COOKING OR THE LIKE
Filed Aug. 5, 1957                                          3 Sheets-Sheet 2
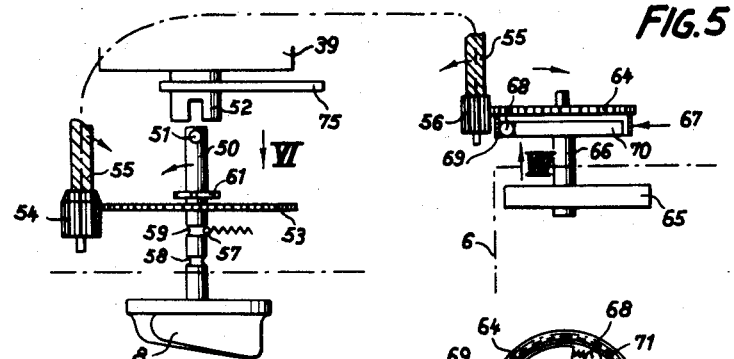
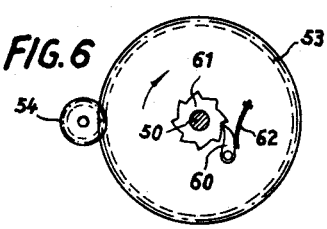
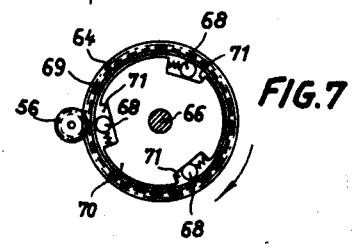
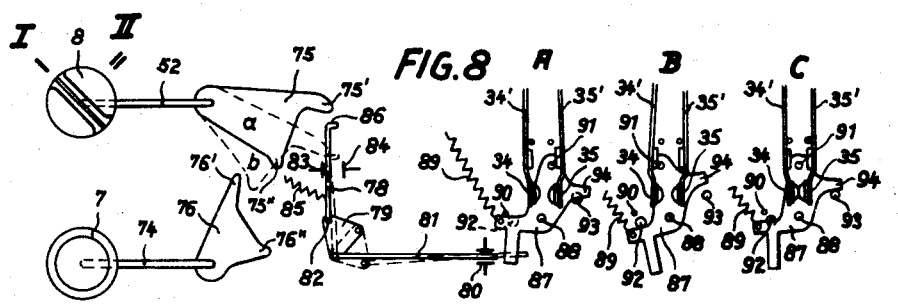
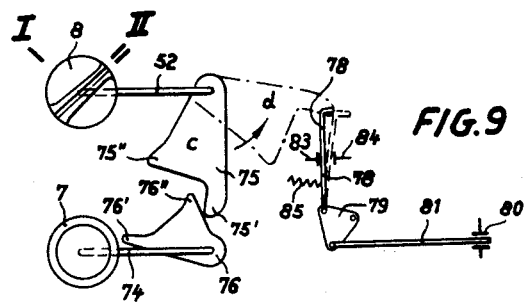
INVENTOR
Heinrich Ritter
Michael S. Striker
BY
ATTORNEY _United States Patent Office_

2,955,186
Patented Oct. 4, 1960

2,955,186

ELECTRIC HEATER FOR COOKING OR THE LIKE

Heinrich Ritter, Esslingen A.N. Lenaustaffel, Germany

Filed Aug. 5, 1957, Ser. No. 676,327

Claims priority, application Germany Aug. 21, 1956

5 Claims. (Cl. 219—20)

The present invention relates to electrical heaters.

More particularly, the present invention relates to electrical heaters which are suitable for cooking purposes and the like, such as hot plates.

One of the objects of the present invention is to provide a heater of the above type which is capable of heating a desired material first in accordance with the temperature to which the material is heated and then according to a preset heat output, all in a fully automatic manner.

Another object of the present invention is to provide a heater of the above type which is capable of being set so as to cook either automatically or non-automatically.

Another object of the present invention is to provide a heater of the above type with a clock mechanism which is capable of setting the heater into operation at a predetermined time of day and then continuing the operation for a preselected period of time.

An additional object of the present invention is to provide a heater with a casing whose front wall carries all of the manually operable components and whose front wall at the same time is removable from the casing and is capable of being mounted on the casing with components carried by the front wall connected electrically with components carried in the interior of the casing.

With the above objects in view, the present invention mainly consists of a heater for cooking or the like, this heater including a heating element means for heating a desired material when the heating element means is energized, a first switch means cooperating with the heating element means for energizing the latter until the material heated reaches a predetermined temperature, and a second adjustable switch means cooperating with the heating element means for adjusting the heat output thereof in accordance with the setting of the second switch means, the first and second switch means being connected in parallel with each other so that after the first switch means ceases to energize the heating element means the second switch means will continue to energize the latter so that it provides the preselected heat output.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of an electrical heater according to the present invention;

Fig. 2 is a perspective view of the heater of Fig. 1 carrying a pot in which is located a material which is to be heated, the pot being a pressure cooker in the example illustrated in Fig. 2;

Fig. 3 is a wiring diagram of the electrical heater of the present invention;

Fig. 4 is a fragmentary diagrammatic illustration of part of a manually operable switch means capable of operating a switch as well as of winding a clock;

Fig. 5 shows schematically the structure of Fig. 4 in a clock winding position, Fig. 5 showing in addition to Fig. 4 structure of the clock;

Fig. 6 is an elevational view of a motion transmitting structure for transmitting motion between the shaft of Figs. 4 and 5 and the drive for winding the clock;

Fig. 7 is a schematic illustration of a one-way drive to the drive shaft of the clock;

Fig. 8 is a schematic illustration of a switch of the clock together with the manually operable structure for controlling the switch, this switch being shown in three different positions in Fig. 8, and the structure of Fig. 8 also being shown together with part of the means for regulating the output of the heater;

Fig. 9 shows the structure of Fig. 8 in the position which it takes when it has been moved to an automatic operating setting.

Figure 10:
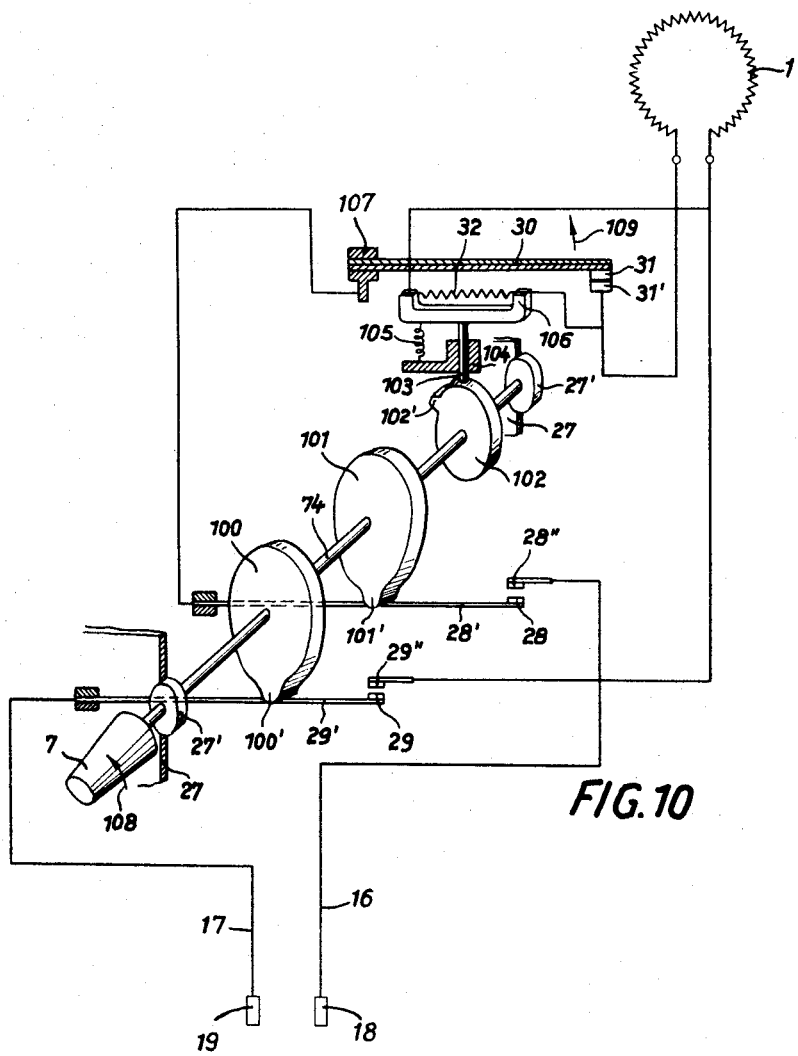
Fig. 10 shows schematically the adjustable switch means which regulates the output of the heater.

Referring first to Fig. 1, it will be seen that the heater illustrated therein includes a hot plate in the form of a plurality of heating elements 1 which are constituted by hollow glow elements. The heating element means 1 is carried within a dish 2 having an upwardly directed concave surface which is of a highly reflecting property so that heat rays are reflected upwardly by the dish 2, this dish 2 being made of any metal or the like which has a suitable upwardly directed shiny surface. The reflector dish 2 is supported within an opening in the top wall of a casing 3 which houses wiring and the like of the heater, this casing 3 being preferably made out of sheet metal having an enamel coating. The casing 3 is provided with feet 4 which rest directly on a surface such as a table top or the like. A screen of low thermal conductivity is located within the casing 3 directly beneath the dish 2 so as to prevent as much as possible the transfer of heat from the reflector 2 into the interior of the casing 3. It will be noted from Fig. 1 that the casing 3 extends forwardly from the heating element means 1 and terminates at its front end in a front wall 5 which is removably connected to the remainder of the casing 3 in any suitable way and which serves to close the casing 3. This front wall 5 is preferably made of a plastic material. As a further measure for minimizing the increase in temperature in the interior of the casing 3, the latter is provided with openings in its wall adjacent to the top wall of the casing so that air may circulate through such openings to carry heat away from the interior of the casing 3.

A clock switch means 6 is carried by the front wall 5 at its inner side, and the face of the clock 6 is visible through an opening in the front wall 5, this opening being covered with glass, for example. The hour markings of the clock are arranged directly on the front wall of the casing about the opening thereof through which the face of the clock is visible. The front wall 5 also carries at its inner face a switch means for regulating the output of the heating element means 1 as well as a manually operable switch means for setting the heater for automatic or non-automatic operation, both of these latter switch means being described in greater detail below. The knob 7 for operating the output regulator and the knob 8 for setting the heater for automatic or non-automatic operation are both accessible at the exterior of the front wall 5. Furthermore, knobs 9, 10 and 11 are accessible at the exterior of the front wall 5, the knob 9 being connected through a suitable motion transmitting structure with the hands 12 of the clock for setting the clock, the knob 10 being connected through a suitable motion transmitting mechanism with the hands 13 of a clockwork which controls the starting of the energizing of the heating element means 1, and the knob 11 being connected through a suitable motion transmitting mechanism with the hands 14 of another clockwork which controls the ending of the operation of the heater.

The electrical current is carried into the casing 3 through a cable 15 which includes a pair of electrically conductive leads 16 and 17 shown diagrammatically in Fig. 3 as terminating respectively in a pair of pins which are adapted to be inserted into a wall plug so that current is derived from the conventional wall plug in a home, for example. Also, a cable 20 leads from the casing 3 and as shown in Fig. 2 terminates in a temperature responsive switch means 21 which is placed in the manner illustrated in Fig. 2 on the cover of a pot 22 which is placed upon the heating element means 1. The pot 22 is a pressure cooker and the temperature responsive switch means 21 is located in the path of steam which escapes from the pressure cooker. The cover of the pressure cooker 22 is provided with a valve which automatically opens when a predetermined pressure is reached within the cooker so as to release steam therefrom, and this steam flows along an opening within a housing 23 carried by the cover of the pressure cooker and in which the temperature-sensitive switch means 21 is inserted.

As is shown in Fig. 3 the cable 20 includes a pair of leads 24 and 25 which are connected with the temperature responsive switch 26 of the switch means 21. The switch 26 is controlled by a control element which is sensitive to temperature and which places the switch 26 in its open position as soon as the temperature-sensitive element is contacted by a very substantial amount of steam which develops in the cooker 22. Such temperature responsive switches are well-known.

The switch means for regulating the output of the heating element means 1 is located within a housing 27 which is indicated diagrammatically in dot-dash lines in Fig. 3. This means includes a two-pole switch 28, 29 located within the housing 27 and serving to close a circuit to the heating element means 1, and furthermore the switch means within the housing 27 includes a switch 31 which is influenced by a bi-metallic strip 30 which in turn is under the influence of a heating coil 32 which is energized and deenergized by the switch 31. Upon turning of the knob 7 the distance between the heating coil 32 and the bi-metallic strip 30 is regulated so that the influence of the heating coil upon the bi-metallic strip 30 may be adjusted. This structure is illustrated in detail in Fig. 10 and is described below in greater detail.

The clock switch means is located within a housing 33 shown schematically in Fig. 3 in dot-dash lines, and this clock switch means includes a pair of switch contacts 34 and 35 which are controlled by the clock mechanism in such a way that the contacts 34 and 35 automatically engage each other as soon as the hands 12 reach the time set by the mechanism 13 and in such a way that these contacts automatically become separated from each other as soon as the hands 12 reach the time which is set at the mechanism 14.

The clock switch contacts 34 and 35 are respectively connected electrically with the contacts 37 and 38 of the manually operable switch means which is operated by turning of the knob 8 and which is located within the housing 39 shown schematically in dot-dash lines in Fig. 3. This manually operable switch means includes a pair of switch levers 40 and 41 which are connected together for turning movement about a pair of parallel axes, respectively, and which can be placed in a pair of positions which will provide either automatic or non-automatic operation. In the position of the switch means 39 which is indicated in Fig. 3 the switch lever 40 interconnects the contacts 34 of the clock switch means with the lead 16 of the cable 15. The lever 41 of the manually operable switch means interconnects in the position of the switch means shown in Fig. 3 the contact 35 of the clock switch means with a lead which is connected distant from the lever 41 with a stationary contact of the switch 28 of the switch means which adjusts the output of the heating element means 1. This switch 28 is connected in series with the control switch 31 which is in turn connected with the heating element means 1, the latter being in turn connected electrically with the switch 29 which in its turn is connected with the lead 17 of the cable 15.

The position of the manually operable switch means 39 shown in Fig. 3 is the position where it sets the heater for automatic operation. This switch means also has a non-automatic position, and in this latter position the lever 40 is turned so that it connects the lead 16 with a contact 43 which is in turn connected with the lead going to the stationary contact of the switch 28. With the parts in this position the switch lever 41 is in an open position where it opens the circuit to the clock switch contact 35 so that the latter is no longer in the circuit. The contact 35 is connected through the lead 24, the switch 26, and the lead 25 to the line which leads from the switch 31 to the heating element means 1. Thus, it is apparent that the temperature responsive switch means 21 and the output regulating switch means 27 are in parallel with each other and are at the same time connected electrically with the heating element means 1.

The front wall 5 of the casing 3 may carry at its outer surface suitable indicia such as "automatic" adjacent the knob 8 to indicate when the latter has been turned to a position which places the switch means 39 in a position which sets the heater for automatic operation as is indicated in Fig. 3. In this position the current flows from the contact 18 over the electrically conductive elements 16, 40, 37, 34, 35, 24, 26, and 25 to the electrical resistance elements of the heat element means 1, and from the latter the current flows through the switch 29 of the output regulating switch means back to the lead 17 and the contact 19. Of course, at this time the clock switch 35, 34 is closed and the switch 26 also is closed. At the same time, it is also possible because of the parallel connection of the switches 26 and 31 for the current to flow through the heat element means 1 from the contact 35 through the electrically conductive elements 38, 41, 28 and 31, and from the heat element means 1 back through the switch 29 to the contact 19. When the switch 26 of the temperature responsive switch means 21 is closed the heating element means 1 is fully energized even if after a period of time the switch 31 has opened because of flexing of the bimetallic strip 30 due to heat from the coil 32. Thus, as long as the switch 26 remains closed the heating continues in an uninterrupted manner at a high rate such as, for example, at an output of 1800 watts. Thus, the initial heating up of the material is carried out in as short a time as possible. As soon as steam develops in the cooker 22 of Fig. 2, for example, and this steam engages the temperature-sensitive element of the switch means 21, then the switch 26 will automatically open. With the switch 26 open the heating element means 1 can be energized only through the switch 31 of the output regulating switch means 27, and thus once the switch 26 is open the heating element means 1 operates so as to provide an output which is controlled by the setting of the knob 7. This knob may be set, for example, to provide an output of 600 watts. If the heat output is insufficient to provide a continuous development of steam, then when the amount of steam produced falls off the temperature responsive switch means 21 may again automatically close until sufficient steam is then provided to cause this switch means to open, and thus under these conditions there may be periodic heating at greater rates.

If the knob 8 is turned to the "non-automatic" position which may be indicated with suitable indicia on the front face of the front wall 5, then the current will flow from the contact 18 through the switch lever 40 and contact 43 to the switch 28 and from the latter through the switch 31 to the heating element 1, and from the latter back through the switch 29 and lead 17 to the contact 19. Thus, with the manually operable switch mans 39 in this latter position the temperature responsive switch means 21 as well as the clock switch means 33 are electrically disconnected from the heating element means 1 as well as the output regulating switch means 27. Therefore, at this time the heater operates exclusively with the output set by the knob 7 of the switch means 27.

In order to indicate whether the manually operable switch means 39 is set for automatic or non-automatic operation, a pair of lamps 45 and 46 may be carried by the front wall 5 of the casing 3. The lamp 45 will be illuminated so as to indicate that the switch means 39 is set for automatic operation, and this lamp 45 is connected electrically with the switch contact 37. The lamp 46 on the other hand becomes illuminated to indicate non-automatic operation, and this lamp 46 is connected electrically with the lead 25 which extends between the switch 26 and the switch 31.

The wiring of the plurality of switch means 27, 33, and 39 carried by the wall 5 at its inner surface terminates in a plurality of electrically conductive pins which are respectively received within a plurality of electrically conductive sleeves carried by a partition wall within the casing 3, these pins respectively extending into the sleeves when the removable wall 5 is mounted on the casing 3. From these sleeves of the partition wall leads go to the heating element means 1 as well as to the cable 15 and the cable 20 which is connected with the temperature-responsive switch means 21.

According to the present invention the knob 8 is turned not only to set the manually operable switch means 39 in its automatic or non-automatic position but also to wind the clock 6. Thus, as may be seen from Figs. 4 and 5, the knob 8 is fixed to the outer end of a shaft 50 which is turnably supported by a bearing carried by the front wall 5 not only for rotation but for axial shifting movement. When the shaft 50 is pushed into its inner position indicated in Fig. 4, a pin 51 carried by the shaft 50 for rotation therewith extends between a pair of jaws of a motion transmitting element 52 of the manually operable switch means 39. Thus, with the shaft 50 in the position shown in Fig. 4 the cross pin 51 will cause the shaft 52 to turn with the shaft 50 and with the parts in this position the knob 8 can be turned so as to set the switch means 39 either in its automatic or non-automatic position. These positions are indicated in Figs. 8 and 9 where the non-automatic position is indicated at I and the automatic operating position is indicated at II. When the shaft 50 is axially shifted to its outer position indicated in Fig. 5, then the cross pin 51 moves out of engagement with the shaft 52 so that turning of the knob 8 at this time will not influence the switch means 39. The movement of the shaft 50 from the position of Fig. 4 to that of Fig. 5 places a gear 53 carried by the shaft 50 in mesh with a pinion 54 connected to a flexible drive shaft 55, the elements 54 and 55 forming part of a drive to the drive pinion 56 of the clock 6. The two positions of the shaft 50 are determined by a spring pressed ball 57 which enters into an annular groove 58 of the shaft 50 when the latter is in the position of Fig. 4 and into an annular groove 59 of the shaft 50 when the latter is in the position of Fig. 5.

The gear 53 is freely turnable on the shaft 50. As is indicated in Fig. 6, this gear 53 pivotally carries a pawl 60 which cooperates with the teeth of a ratchet wheel 61 fixed to the shaft 50, a leaf spring 62 being carried by the gear 53 and engaging the pawl 60 for urging the latter into engagement with the ratchet wheel 61. When the shaft 50 is in the position of Fig. 5 and the knob 8 is turned so as to cause the shaft 50 and the ratchet wheel 61 to turn in a clockwise direction as indicated by the arrow in Fig. 6, a drive will be transmitted from the ratchet wheel 61 to the pawl 60 to the gear 53 and from the latter to the pinion 54 so as to operate the drive which extends to the clock 6 for winding the latter. When the knob 8 is turned to the opposite direction the teeth of the ratchet wheel 61 simply ride along the pawl 60 and no turning movement is transmitted to the pinion 54 so that the drive to the clock does not operate.

The pinion 56 of this drive meshes with a gear 64 which is connected with the spring barrel 65 of the watch through a one-way motion transmitting means 67 and a shaft 66. The motion transmitting means 67 includes a plurality of spring-pressed balls 68 (Fig. 7) respectively located in cutouts 71 of a plate 70 which is fixed to the drive shaft 66 for rotation therewith, and this plate 70 is located within a ring 69 which is fixed to the gear 64. When the knob 8 is turned so as to cause the gear 53 to turn in the direction of the arrow shown in Fig. 6, the ring 69 will turn in the direction of the arrow shown in Fig. 7, and through the one-way drive means 67 the shaft 66 will be turned so as to tension the spring of the spring barrel 65 and in this way wind the clock. When the clock runs, however, the shaft 66 together with the plate 70 are turned in the opposite direction and the ball members 68 ride freely along the ring 69 without transmitting any turning thereto. The one-way drive thus separates the friction of the drive 54—56 from the clock 6 so that the entire force of the spring barrel 65 is devoted to the operation of the clock.

Thus, with the shaft 50 in the position of Fig. 5 and upon turning of the knob 8 so as to turn the gear 53 in the direction indicated by the arrow in Fig. 6 the clock may be wound, and after the winding of the clock is completed the knob 8 together with the shaft 50 are pushed inwardly and the knob 8 is turned until the cross pin 51 enters into the space between the jaws of the shaft 52 of the switch 39. Now the knob 8 may be turned so as to move from the position I indicated in Fig. 8 to the position II indicated in Fig. 9 so as to set the heater for automatic operation.

As is indicated in Fig. 8 the shaft 52 of the switch means 39 carries a lever 75 and the shaft 74 of the output regulating switch means 27 carries a lever 76. When the knob 8 is in position I which is the setting for non-automatic operation the lever 75 does not interfere with the turning of the lever 76. Thus, at this time the output regulating switch means can be set in any desired position. The lever 75 has a projection 75' which cooperates with a linkage means for setting the clock switch elements 34, 35 in their operating position when the knob 8 is turned from position I to position II. When the knob 8 is in position I, the switch elements 34 and 35 are in an idle position where they are separated from each other, while when the knob 8 is in position II these switch elements 35 are in a position where they are capable of moving into contact with each other. The linkage means includes an upwardly directed arm 78 which is pivotally connected at its bottom end, as indicated at 82 in Fig. 8, to a triangular plate 79 which is supported at its right end, as viewed in Fig. 8 in the solid line position of the plate 79, for turning movement about a stationary axis. The plate 79 is in turn pivotally connected with one end of a push rod 81 which is shiftable in a bearing 80 which is turnably carried by the casing 3. The push rod 81 is shiftable in a substantially horizontal direction, as viewed in Fig. 8, while the push rod or lever 78 is shiftable in a substantially vertical direction. The lever 78 is turnable about its pivotal connection 82 with the plate 79 between a pair of stops 83 and 84, and a spring 85 is connected at one end to the casing 3 and at its opposite end to the lever 78 so as to urge the latter to a rest position where it engages the stop 83 which is adjacent to the lever 75. The projection 75' of the lever 75 is located over the free end 86 of the lever 78, as indicated in Fig. 8, when the knob 8 is in the position I. The right free end of the push rod 81, as viewed in Fig. 8, cooperates with a tilt plate 87 which is supported by a stationary pivot pin 88 carried by the casing 3 for turning movement about a stationary axis and which controls the contacts 34 and 35.

A spring 89 which is connected at one end to a stationary element of the casing 3 is connected at its opposite end to the tilt plate 87 so as to urge the latter to turn in a clockwise direction about the pivot pin 88, and a stop pin 90 carried by the casing 3 limits the turning of the tilt plate 87 by the spring 89. In this position which is indicated at A in Fig. 8 the pin 91 carried by the tilt plate 87 engages the springy arm 35' which carries the contact 35 so as to maintain the latter at all times separate from the contact 34, and thus position A of Fig. 8 illustrates the idle position of the contacts 34 and 35. In order to place these contacts in their operating position where they are capable of being placed into engagement with each other the tilt plate 87 is turned from the position of Fig. 8 A to the position B of Fig. 8, and in this position the pin 91 of the tilt plate 87 presses against the springy arm 34' which carries the contact 34, and in this position the contacts 34 and 35 are also separate from each other, but they are capable of being placed in engagement with each other. The casing 3 supports a pin 92 in a position where it is pressed by a spring, for example, against the tilt plate 87 in the position A of the latter of Fig. 8, and as soon as the tilt plate 87 reaches position B this pin 92 projects forwardly over an edge of the tilt plate 87 so as to maintain the latter in the position B indicated in Fig. 8. A second spring pressed pin 93 is freed for outward movement upon turning of the plate 87 from position A to position B of Fig. 8, and when the tilt plate turns from position B of Fig. 8 to position C of Fig. 8 a projection 94 of the tilt plate 87 will engage the pin 93 which has moved outwardly so that this pin 93 prevents the tilt plate 87 from returning to position A, and it will be noted that in position C the contacts 34 and 35 engage each other. Thus, when the plate 87 has the position shown at C of Fig. 8 the pin 91 is located between the spring arms 34' and 35' and does not engage either of these arms so that they move the contacts 34 and 35 into engagement with each other. The clock mechanism automatically withdraws the pin 92 from the position it has in Fig. 8 B to the position it has in Fig. 8 A when the time set on the device 13 is reached by the hands 12. Thus, this withdrawal of the pin 92 frees the plate 87 to the influence of the spring 89 to be turned by the latter to the position of Fig. 8 C where the contacts 34 and 35 engage each other and thus the cooking or other heating begins. When the time at which the device 14 is set is reached by the hands 12 then the pin 93 is automatically withdrawn back to its rest position and the spring 89 now turns the plate 87 back to position A and the pin 91 engages the springy arm 35' so as to open the switch 34, 35, and thus the operation of the heater is terminated.

The turning of the plate 87 from the rest position of Fig. 8 A to the operating position of Fig. 8 B is brought about by turning the knob 8 of the manually operable switch means 39 from position I to position II. During such turning the lever 75 turns from the position indicated by *a* in Fig. 8 through the position *b* shown in Fig. 8 in dotted lines to the position *c* indicated in Fig. 9, and during such turning the lever 75 rotates approximately 90°. At the beginning of its turning movement the projection 75' of the lever 75 engages the top end 86 of the lever 78 and moves the latter downwardly so that it slides along the stop 83 until the lever 75 reaches the position *b* indicated in dotted lines in Fig. 8. At this moment the push rod 81 has turned the tilt plate 87 from position A of Fig. 8 to position B where the switch 34, 35 is in its operating position. At this time the projection 75' slides off from the lever 78 and the latter is returned to its rest position against the stop 83 by the spring 85, the plate 87 remaining in the position B of Fig. 8 due to the engagement of the pin 92 with an edge of the plate 87, as was described above. During further turning of the lever 75 toward the position thereof shown in Fig. 9 the lever 75 moves entirely away from the lever 78 and the spring 85 returns the latter together with the entire linkage means to its starting position.

The lever 75 has a second projection 75" which upon turning of the lever 75 beyond position *b* to position *c* engages a projection 76' of the lever 76 which is fixed to the shaft 74 which carries the knob 7, this lever 76 being in its rest position in Fig. 8. The engagement of the projection 75" of the lever 75 with the projection 76' of the lever 76 will turn the lever 76 together with the knob 7 from their zero position of Fig. 8, and when the projection 75" has turned beyond the projection 76' the projection 75' will engage a projection 76" of the lever 76 to continue the turning of the latter until the lever 76 reaches the position indicated in Fig. 9, and in this latter position the output regulating switch means 27 is in a position where the output is suitable for all cooking conditions. Thus, upon turning of the knob 8 so as to place the heater in its automatic operating position the output regulating switch means 27 is automatically set so as to provide an output which is suitable for all conditions.

Upon return of the knob 8 from position II to position I, so as to set the heater for non-automatic operation, the lever 75 does not influence the lever 76 which remains in the position of Fig. 9 and the nose or projection 75' of the lever 75 snaps over the top of the lever 78 which yieldably gives way to the projection 75' as the latter returns to the position *d* indicated in dot-dash lines in Fig. 9. The knob 7 of the output regulating switch means 27 is then turned back manually to its zero position or it can be set in any desired position for non-automatic cooking.

Fig. 10 illustrates the details of the switch means 27 for regulating the output of the heating element means 1. As may be seen from the structure illustrated diagrammatically in Fig. 10 the housing of the switch means carries a bearing 27' in which the shaft 74 is turnable. Fig. 10 shows a pair of bearings 27' carried by the front and rear walls of the housing of the switch means 27 and supporting the shaft 74 for rotation. As may be seen from Fig. 4 the lever 75 which is fixed to the shaft 52 is located at the exterior of the housing of the switch means 39, and in the same way the lever 76 which is fixed to the shaft 74 is located at the exterior of the housing of the switch means 27 just beneath the lever 75, this lever 76 being omitted from Fig. 10 for the sake of clarity. The shaft 74 carries a pair of cam discs 100 and 101 and these cam discs respectively have camming portions 100' and 101' which respectively cooperate with the springy arms 29' and 28' which respectively carry the contacts 29 and 28 which are movable together with these arms respectively toward and away from the stationary contacts 29" and 28" of the switches 28 and 29, respectively. These switches are shown in Fig. 10 in their open position. Also, the shaft 74 carries a cam disc 102 which is provided with a spiral outer periphery extending from one end of a shoulder 102' around to the opposite end thereof. This cam 102 cooperates with a cam follower rod 103 which is slidable within a stationary bearing 104 carried by the housing of the switch means 27. The rod 103 is fixed to a member 106 of electrically nonconductive material, and this member 106 is urged by the spring 105 toward the bearing 104, so that in this way the follower 103 is always maintained in engagement with the periphery of the cam 102. The insulation member 106 carries the heating coil 32 which influences the bi-metallic strip 30. This bi-metallic strip 30 is clamped at one end to a carrier element 107 which is fixedly carried by the housing of the switch means 27, and the opposite free end of the bi-metallic strip 30 carries a contact 31 which cooperates with a stationary contact 31' supported in any suitable way by the housing of the switch means 27. When the knob 7 is turned in the direction of arrow 108 of Fig. 10 the cams 100 and 101 are turned so as to move out of engagement with the springy arm 21' and 28', respectively, and thus the switches 28 and 29 are closed. The closing of these switches completes a circuit in which the heating coil 32 and the switch 31 are located in series with respect to each other. At the moment when the switches 28 and 29 are closed the heating coil 32 is at a predetermined minimum distance from the bi-metallic strip 30. Therefore, at this time the influence of the heating coil 32 on the strip 30 is at a maximum. If the switch means remains in this position the influence of the heating coil 32 on the strip 30 will take place in a relatively short time and after a relatively short period the strip 30 will bend outwardly in the direction of arrow 109 of Fig. 10 so as to open the switch 31.

By further turning of the knob 7 the cam 102 will be turned so that the cam follower rod 103 moves downwardly under the influence of the spring 105 and as a result the heating coil 32 is positioned more distant from the bi-metallic strip 30. Therefore the influence of the heat from the heating coil 32 on the bi-metallic strip 30 gradually diminishes with this structure. Therefore, the more the knob 7 is turned in the direction of the arrow 108 of Fig. 10 the more distant will the heating coil 32 be from the bi-metallic strip 30 and the longer will the switch 31 remain closed. Thus, by turning the knob 7 in the direction of arrow 108 of Fig. 10 the average heat output of the heater can be steplessly increased. Of course, the extent of turning of the knob 7 is limited by engagement of the step 102' of the cam 102 with the pin 103.

It will be understood that each of the elements described above, or two or more together, may also find a useful application in other types of heaters differing from the types described above.

While the invention has been illustrated and described as embodied in electrical cookers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is desired as new and desired to be secured by Letters Patent is:

1. In an electric heater for cooking or the like, in combination, heating element means for providing a heat output when said heating element means is electrically energized; first switch means mounted in their entirety distant from said heating element means and responsive only to the temperature of a material heated by said heating element means and connected electrically with said heating element means for maintaining the latter energized until the temperature of the material being heated reaches a predetermined value; second switch means connected electrically with said heating element means for adjusting the heat output thereof in accordance with the setting of said second switch means, said first and second switch means being connected in parallel with each other so that after said predetermined temperature is reached so that said heating element means is not energized by first switch means said heating element means will continue to operate at the output determined by the setting of said second switch means; third clock-controlled switch means connected in series with said first and second switch means for controlling the times when said first and second switch means start and stop the energizing of said heating element means; and manually operable switch means movable between automatic and non-automatic positions and connected electrically with said first, second and third switch means for maintaining the electrical connection between said first, second and third switch means when said manually operable switch means is in its automatic position and for electrically disconnecting said first and third switch means from said heating element means and second switch means when said manually operable switch means is in its non-automatic position.

2. In an electrical heater for cooking and the like, in combination, heating element means for heating a desired material when said heating element means is electrically energized; first switch means connected electrically with said heating element means for controlling the energizing thereof; second manually operable switch means movable between automatic and non-automatic positions for setting said first switch means to energize said heating element means automatically or non-automatically, respectively; clock means cooperating with said first switch means for controlling the starting and stopping of the energizing of said heating element means at predetermined times when said manually operable switch means is set in its automatic position, said manually operable switch means including a manually engageable knob, a shaft fixed to said knob, a support supporting said shaft for turning movement about its axis and for shifting movement along its axis, a drive extending to said clock for winding the latter and actuated by turning of said knob when the latter is shifted to a clock winding axial position, and a motion transmitting means connected with said manually operable switch means and cooperating with said shaft when the latter is in a second switch operating axial position for changing the position of said second switch means when the knob is turned.

3. In an electrical heater for cooking and the like, in combination, heating element means for heating a desired material when said heating element means is electrically energized; first switch means connected electrically with said heating element means for controlling the energizing thereof; second manually operable switch means movable between automatic and non-automatic positions for setting said first switch means to energize said heating element means automatically or non-automatically, respectively; clock means cooperating with said first switch means for controlling the starting and stopping of the energizing of said heating element means at predetermined times when said manually operable switch means is set in its automatic position, said manually operable switch means including a manually engageable knob, a shaft fixed to said knob, a support supporting said shaft for turning movement about its axis and for shifting movement along its axis, a drive extending to said clock for winding the latter and actuated by turning of said knob when the latter is shifted to a clock winding axial position, and a motion transmitting means connected with said manually operable switch means and cooperating with said shaft when the latter is in a second switch operating axial position for changing the position of said second switch means when the knob is turned, said drive from said shaft to said clock including a flexible shaft and a one-way motion transmitting means interconnecting said flexible shaft with the drive shaft of the clock.

4. In an electric heater for cooking, or the like, in combination, heating element means for providing a heat output when said heating element means is electrically energized; a heating vessel on said heating element means for boiling a liquid therein and being formed in the cover thereof with a passage through which steam forming in the vessel is adapted to escape; first switch means located in said passage and responsive only to the temperature of the steam escaping therethrough and connected electrically with said heating element for maintaining the latter energized as long as steam passes through said passage; elongated flexible conductor means for electrically connecting said first switch means with said heating element means; and second switch means connected electrically with said heating element means for adjusting the heat output thereof in accordance with the setting of said second switch means, said first and second switch means being connected in parallel with each other so that after said predetermined temperature is reached so that said heating element means is not energized by said first switch means said heating element will continue to operate at the output determined by the setting of said second switch means.

5. An electric heater as defined in claim 4 and including a heating vessel on said heating element means for boiling a liquid therein and being formed in the cover thereof with a passage through which steam forming in the vessel is adapted to escape, and in which said first switch means are located in said passage and responsive only to the temperature of the steam escaping therethrough; and elongated flexible conductor means for electrically connecting said first switch means with said heating element means so that the latter remains energized as long as steam passes through said passage.

References Cited in the file of this patent

UNITED STATES PATENTS

| | | |
|---|---|---|
| 1,975,658 | Marshall | Oct. 2, 1934 |
| 2,386,009 | Smith | Oct. 2, 1945 |
| 2,427,945 | Clark et al. | Sept. 23, 1947 |
| 2,581,343 | Ames | Jan. 8, 1952 |
| 2,591,849 | McDowell | Apr. 8, 1952 |
| 2,715,673 | Schroeder | Aug. 16, 1955 |
| 2,767,293 | Jordan et al. | Oct. 16, 1956 |
| 2,798,929 | Wojcik | July 9, 1957 |
| 2,817,401 | Ostrander | Dec. 24, 1957 |
| 2,837,621 | Lux et al. | June 3, 1958 |